United States Patent [19]

Gronbech

[11] Patent Number: 5,032,105
[45] Date of Patent: Jul. 16, 1991

[54] APPARATUS TO BE USED FOR CUTTING-OFF THE HEADS OF FISH

[75] Inventor: Carl-Erik Gronbech, Ronne, Denmark

[73] Assignee: Aktieselskabet A. Espersen, Ronne, Denmark

[21] Appl. No.: 488,059

[22] PCT Filed: Dec. 16, 1988

[86] PCT No.: PCT/DK88/00210
§ 371 Date: Jun. 18, 1990
§ 102(e) Date: Jun. 18, 1990

[87] PCT Pub. No.: WO89/05585
PCT Pub. Date: Jun. 29, 1989

[30] Foreign Application Priority Data

Dec. 18, 1987 [DE] Fed. Rep. of Germany ....... 6700/87

[51] Int. Cl.$^5$ ............................................. A22C 25/14
[52] U.S. Cl. .................................... 452/108; 452/170
[58] Field of Search ................. 452/108, 64, 161, 166, 452/170, 149, 154

[56] References Cited

U.S. PATENT DOCUMENTS

| | | | |
|---|---|---|---|
| 3,525,121 | 8/1970 | Elich | 452/108 |
| 3,838,478 | 10/1974 | Wulff | 452/166 |
| 3,919,741 | 11/1975 | Backhaus et al. | 452/170 |
| 3,925,847 | 12/1975 | Leander et al. | 452/154 |
| 4,389,750 | 6/1983 | Kristinsson et al. | 452/154 |

Primary Examiner—Willis Little
Attorney, Agent, or Firm—Watson, Cole, Grindle & Watson

[57] ABSTRACT

An apparatus to be used for cutting-off the heads of fish comprises a frame (1) with conveyance means (2,3,6) comprising holding means (7) for supporting the bodies of the fish and their heads for transport of the fish bodies and the heads crosswise with respect to the longitudinal direction of the fish at a head cutting-off station comprising two rotating knives (50,51). One of the knives (50) serves for providing a cut 53 which extends from the back of the fish behind its head and inclined inward and rearward towards the tail of the fish, whereas, the other knife (51) serves for providing a cut (54) extending from the abdominal side of the fish and inclined inward and backward towards the tail of the fish. The knives (50,51) are arranged with their circumferences closely ajacent each other. In order to avoid the use of two conveyors, viz. one for supporting the fish bodies and another one for supporting the heads, the holding means (7) for each fish comprise a saddle (8), carried by a conveyor (2,3,6), for supporting the body of the fish and a support (10), carried by the same conveyor, for supporting the head of the fish. The head support (10) is pivotably arranged with respect to the corresponding saddle (8) for pivoting the head support in such a way that the head support can pass the knives (50,51) of the head cutting-off station.

9 Claims, 9 Drawing Sheets

United States Patent Office

PTO - BOYERS, PA Duty Station

MISSING PAGE TEMPORARY NOTICE

PATENT # 5032105      FOR ISSUE DATE 7-16-91

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

DRAWING SHEET # All Drawings except # 1

Data Conversion Operation
Boyers, Pa

5,032,105

APPARATUS TO BE USED FOR CUTTING-OFF THE HEADS OF FISH

BACKGROUND OF THE INVENTION

The present invention relates to an apparatus for cutting-off the heads of fish and of the kind comprising a frame with conveyance means comprising holding means which for each fish comprise a saddle carried by a conveyor for supporting the body of the fish and a support carried by the same conveyor for supporting the head of the fish for transport of the fish bodies and the heads crosswise with respect to the longitudinal direction of the fish at a head cutting-off station comprising two rotating knives, one of which serves for providing a cut extending from the back of the fish behind its head and inclined inward and rearward towards the tail of the fish, and the other of which serves for providing a cut extending from the abdominal side of the fish and inclined inward and rearward towards the tail of the fish, said knives being arranged with their circumferences closely ajacent each other.

An apparatus of this kind is known from WO 87/05188. According to this prior art the knife providing the cut extending from the abdominal side of the fish and the motor driving this knife are pivotal about an axis extending generally parallel with the direction of movement of the conveyor which carries the fish through the head cutting-off station. The motor is by means of a connecting rod and a pivot arm connected with a rocking lever provided with a cam disc. When a saddle cooperates with the cam disc of the rocking lever and the knife referred to is pivoted so as to provide a cut extending more than 180° around the spine of the fish. The pivoting of the knife also permits the support supporting the head of the fish to pass through the cutting-off station.

According to the present invention the head support is pivotally arranged with respect to the corresponding saddle in such a way that the head support is pivotal from a position for supporting the head and to a position which allows the passage of the holding means past the knifes of the head cutting-off station. Hereby a far more simple structure of the apparatus is question may be obtained because the pivoting of the motor according to the prior art referred to above and the means necessary therefor may be avoided.

BRIEF DESCRIPTION OF THE DRAWINGS

The invention will hereinafter be further explained with reference to the drawings in which:

FIG. 2 shows a section according to section line II—II in FIG. 1, FIG. 3 shows a side view on an increased scale of a fish holder for the apparatus shown in FIG. 1, FIG. 4 shows the holder of FIG. 3 as seen from the right-hand side of FIG. 3, i.e. from the end which in FIG. 1 points into the drawing plane, FIG. 5 shows a top view of the holder in FIG. 3, FIG. 6 shows a fish holder in a release position for a head support of the fish holder, seen from the rear side of the drawing plane in FIG. 1, FIG. 7 shows a picture illustrating a readjustment of a fish holder on a slightly reduced scale and seen from the rear side of the drawing plane in FIG. 1, FIG. 8 shows another embodiment of the apparatus in FIG. 1, viz. with a further set of knives also seen from the side where a fish, the head of which is being cut-off, is seen from the tail end, FIG. 8A shows a side view of a fish for illustrating the parts into which the fish is cut by means of the embodiment of the apparatus shown in FIG. 8, and FIG. 9 shows a section according to section line IX—IX in FIG. 8.

DETAILED DESCRIPTION OF THE PREFERRED EMBODIMENTS

Figure 1:
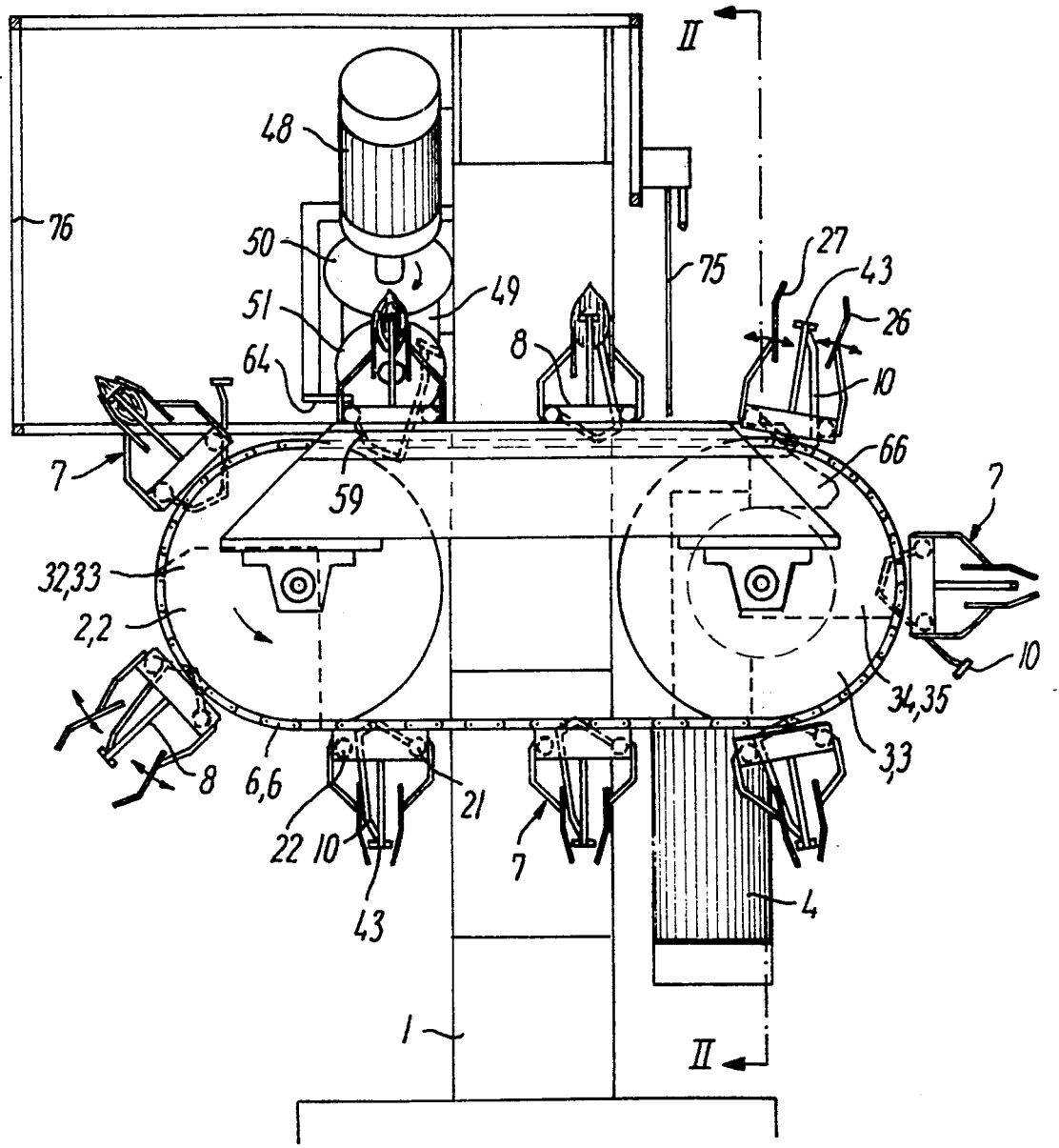
FIG. 1 shows a side view of an embodiment of the apparatus according to the invention seen from the side where a fish, the head of which is being cut-off, is seen from the tail end.

In the drawing, 1 is a frame which supports the parts of the apparatus shown. At each end of the frame a double sprocket 2,2 and 3,3, respectively, is rotatably supported. The sprockets 2,2 and 3,3 are rotatable by means of a motor 4 in the directions of rotation indicated by means of arrows.

The two double sprockets 2,2;3,3 drive a conveyor which consists of a double endless chain 6,6 serving to move a row of fish holders 7 through the apparatus.

The construction of the fish holders appears clearly from FIGS. 3, 4 and 5. Each holder consists of a saddle 8 which serves for supporting the bodies of the fish, the heads of which are to be cut-off, and of a support 10 which serves for supporting the head of a fish. Each saddle 8 consists of a body 11 secured to a bottom plate 12 comprising two end extensions 14,14 serving to guide the saddles 8, seeing that each of the end extensions 14,14, along the major part of the upper run of the chains 6, slides in a slide guiding 15 and 15, respectively, each of which has a recess 16 into which the corresponding end extension fits. Moreover, the end extensions 14,14 are guided by means of two guiding ledges 17,17, each of which is secured to the upper side of one of the sliding guides 15 and 15, respectively.

To the lower surface of each bottom plate 12 two brackets 18,18 are secured, by means of which the corresponding saddle is connected with the two chains 6,6.

Moreover, each of the bottom plates 12 carries a crosswise extending upright wall 19 from which two swing arms 24,25 are pivotably suspended by means of two bolts 20,21 with corresponding spacer tubes 22,23. At the upper end, each of the arms carries a side guide 26 and 27, respectively, and moreover, the arms are mutually connected by means of a tension spring 28. Moreover, each swing arm 24,25 carries at the lower end a cam follower 29 and 30, respectively, FIG. 4, which, as it appears from FIG. 3, are offset with respect to each other. At one side of each of the double sprockets 2,2 and 3,3, viz. behind these sprockets as seen in FIG. 1, two cams 32,33 and 34,35, respectively, are secured to the frame for cooperation with the cam followers 29,30, cf. FIG. 3.

Each side guide 26,27 consists of metal plate material and has been deformed in such a way that their inner surfaces are adapted to the sides of the fish to be treated, in particular cod.

At the front end each side guide 26,27 is delimited by an edge 36, FIG. 3, extending inclined downward and rearward and by an edge 37 extending inclined upward from below and rearward, which serve for positioning a fish when it is to be arranged upon the saddle in question, cf. FIG. 2, seeing that the fish is arranged with its pectoral fins outward with respect to the notch which the inclined edges 36,37 form in each side guide.

To each of the swing arms 24,25 a stop 40,40 is secured, which, as it appears from FIG. 3, extends inclined rearward and downward and each of which ends with an abutment block 41. A saddle is shown in full lines in FIG. 4 in the position which it occupies when no fish is arranged upon the saddle. As it will be seen, the two blocks 41 abut against the body 11 in this position whereby the two side guides 26,27 are prevented from abutting each other along their edges and, accordingly, are prevented from causing unnecessary noise. In FIG. 4 the saddle is shown in dotted lines in its open position. This position is caused by the cooperation between the two cam followers 29,30 and their corresponding cam 32,33;34,35 at each end of the apparatus.

One of bolts 20,21, viz. the bolt 21 shown to the right in FIG. 4, is extended compared with the swing bolt 20 positioned to the left and upon the extension the head support 10 is pivotably arranged by means of a hub 42, FIG. 3. The holder 10 itself consists of a supporting plate 43 and a rod part 44 connecting the plate 43 with the hub 42. The rod part 44 consists of four sections 45, 46, 47 and 48a extending in continuation of each other. As seen from the plate 43, the sections extend as follows:

The section 45 extends inclined downward to the left as shown in FIG. 4, whereafter the section 46 follows with a little less inclination with respect to vertical direction. Then the section 47 follows, which forms an angle generally of 90° with respect to the section 46, and then the section 48a follows which extends inclined upward and at its end is secured to one of the sides of the hub 42. As it appears from FIG. 3 compared with FIG. 4, the rod part 44, accordingly, forms a bay, the bottom of which is formed by the rod section 47 facing away from the body 11 of the saddle and extending inclined downward to the left in FIG. 4.

Figure 1A:
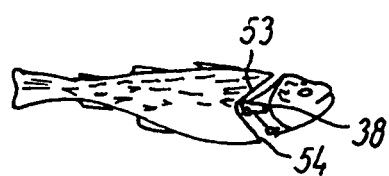
FIG. 1A shows a side view of a fish, the head of which has been cut-off by means of the apparatus shown in FIG. 1.

As it appears from FIG. 2, two motors 48 and 49 are secured to the frame 1, each of which carries a circular knife 50 and 51, respectively. These knives form a generally rectangular angle with each other and, as it also appears from FIG. 2, they generally follow the edges 36,37 of the side guides 26, 27. The knives 50,51 constitute the head cutting-off station and they are, as it also appears from FIG. 1, arranged closely above each other and, moreover, in such a way that their circumferences are positioned very closely ajacent each other as it also appears from FIG. 2. Accordingly, when a fish has been arranged upon a saddle 8 and the saddle passes the cutting-off station, the head of the fish will be cut-off by means of two inclined cuts 53,54 as it appears from FIG. 1A. One of the cuts 53, which is provided by the upper circular knife 50, extends from the rear side of the fish closely behind the head of the fish and inclined inward and towards the tail of the fish, whereas the other cut 54, which is provided by the means of the knife 51, extends inclined upward from below and inward and rearward toward the tail. This latter cut 54 will be positioned behind the pectoral fins, cf. 38 in FIG. 1A, due to the positioning of the fish previously explained, cf. FIG. 2.

As it appears from FIGS. 3 and 5, a guiding stud 56 is secured to the rod part 44, more definitely defined to the section 48a of the rod part. When a saddle 8 is being moved by means of the chains 6,6 along their upper run, the guiding stud 56 is accommodated in a sliding groove 57, provided in a sliding guide 58, supported by the frame 1 of the apparatus and extending along the slide guidings 15,15. The sliding groove 57 ends at a location 59, FIG. 1, which, as seen in the direction of movement of the chains, is positioned a small distance after the position at which the knives 50,51 will start engagement with the fish in question. After the location 59, as seen in the direction of movement, the lower delimitation of the sliding groove 57 has been removed and, accordingly, it will be understood that the head support 10, when the guiding stud 56 reaches and passes the location 59, may pivot (clockwise in FIG. 1, counter-clockwise in FIG. 4 and 6). In order to limit the pivoting of the head support 10, a generally U-shaped mounting 60 is secured to the spacer tube 23, which is arranged upon the same bolt 21 as the hub 42 for the holder 10. A stop 61 secured to the hub 42 extends into the mounting 60. As it appears from the FIG. 4 and 6, the mounting 60 allows the stop 61 and, accordingly, also the head support 10 to pivot approximately 45° counter-clockwise whereby the head support 10 will be moved from the position shown in full lines in FIG. 4 to the position shown in dotted lines.

In order to secure the realization of this pivoting, when the guiding stud 56 is being moved out from the sliding groove 57 at the location 59, the hub 42 carries an abutment plate 63 and an abutment pin 64, FIGS. 1 and 6, is secured to the frame 1. The abutment pin 64 is arranged in such a way that when the guiding stud 56 leaves the sliding groove 57 at the location 59, the pin 64 abuts the abutment plate 63 whereby the pivoting of the head support 10 explained above is obtained with certainty. Moreover, from FIG. 1 it will be understood that the head support 10, due to the distribution of its weight, will have a natural tendency to pivot clockwise as seen in FIG. 1.

Behind the cams 34,35, FIG. 1, a further cam 66 is secured. The cam 66 is shown more clearly in FIG. 7 which shows the upper right-hand part of the sprockets 3,3 in FIG. 1 but seen in direction from the reverse side of the drawing plane in FIG. 1. During upward movement around the sprockets 3,3, the head support 10 of a holder 7 will pivot due to the gravity, viz. clockwise in FIG. 1. The further cam 66 serves for moving the head support 10 to upright position so as to occupy its head supporting position before it in this position may be guided by means of engagement between the guiding stud 56 and the guiding groove 57. As it appears from FIG. 7, in dotted lines, the guiding stud 56 of a support 10 will, when abutting an abutment edge 67 on the cam 66, pivot the support 10 clockwise, FIG. 7, to the support position which is shown in full lines and a following guiding edge 68 on the cam 66 will guide the guiding stud 56 into the guiding groove 57.

The apparatus explained operates in the following way:

During the upward movement around the pair of sprockets 3,3 (to the right in FIG. 1 and FIG. 7), the two cam followers 29,30 of a saddle will slide up upon the circumferences of the cams 34,35 whereby the swing arms 24,25 of the saddle in question will be pivoted to the position shown in dotted lines, FIG. 4. This position is shown to the right in FIG. 1, viz. immediately before the upper saddle shown there is transferred to the horizontal run of the pair of chains. While the saddle in question occupies the open position and after the support has been moved by means of the cam 66 as just explained, a fish, for instance a cod, is arranged upon the body of the saddle in question, FIG. 2, viz. in such a way that the pectoral fins 38 are positioned as previously explained. Simultaneously, the head support 10 occupies a generally vertical position in such a way that the plate 43 of the support 10 may serve for supporting the head of the fish in question by engagement between the jaw parts. Thereby the fish in question is well supported and, furthermore, the the position of the head with respect to the saddle in question is secured due to the fin engagement explained. During continued movement in the feeding direction, marked by means of an arrow in FIG. 1, the head support 10 will be maintained in the vertical head supporting position by means of the engagement between the guiding stud 56 and the corresponding sliding groove 57 and the fish will be clamped between the side guides 26,27 by means of the spring 28 because the cam followers 29,30 leave the cams 34,35. When the saddle in question reaches the location 59, the guiding stud 56 will be released as previously explained and, simultaneously, the fish will be caught between the knives 50 and 51 which, due to their direction of rotation, will draw the fish to the left in FIG. 1. Generally, simultaneouly with the catching of the fish, the pin 64, FIG. 6, will abut the abutment plate 63 whereby the head support 10 will be pivoted to the position shown in dotted lines in FIG. 1. In this position the head support 10 is able to pass beneath the shaft 51a, FIG. 2, for the lower knive in such a way that the support is able to pass the head cutting-off station without producing any collision with the head support 10 and the knives 50,51 inclusive of their suspensions and motors. Simultaneously, the bay of the rod part 44 allows the supporting of the head to be continued until the knives catch the fish because this bay allows the supporting plate 43 to be moved into an overhead position with respect to the lower knife 51. The cut-off head will be thrown to the left in FIG. 1 by the knives 50,51 and due to the fact that the body is still secured by means of the side guides 26,27, an effective head removal, accordingly, will be achived. During the downward movement around the pair of sprockets 2,2 the two cam followers 29,30 of a saddle will move upward on the edges of the cams 32,33 there positioned whereby the saddle in question again will be opened as shown at the bottom to the left in FIG. 1 whereby the fish body is released. During the downward movement of a saddle, the corresponding head support 10 will, due to gravity, be pivoted counter-clockwise so as to again occupy the head supporting position as shown at the bottom to the left in FIG. 1.

According to the embodiment shown in FIGS. 8 and 9, the apparatus has been supplemented with two further circular knives 70,71 arranged in front of the knives 50 and 51, as seen in the direction of movement of the holders 7. The knives 70 and 71 are releasably mounted upon the frame of the apparatus and are driven by motors 48 and 49, respectively, seeing that each of the shafts 50a and 51a, respectively, of the motors by means of a drive belt 72 and 73, respectively, is connected with a shaft 70a and 71a, respectively, for the knife 70 and 71, respectively. The knives 50 and 71 are arranged approximately in the same plane, however, with the knife 70 offset a small distance upward with respect to the knife 50. The knives 51 and 71 are arranged offset with respect to each other in the axial direction, viz. corresponding to the thickness of a breast intermediate piece 73a of the fish, cf. FIG. 8A. According to the embodiment in FIGS. 8 and 9, the abutment pin 64 for the embodiment according to FIGS. 1-7 has been exchanged for a longer abutment pin 64a. The difference between the lengths of the abutment pins 64 and 64a corresponds to the distance between the vertical plane wherein the shafts 50a and 51a are positioned and the vertical plane wherein the shafts 70a and 71a are positioned. Moreover, the lower delimitation of the sliding groove 57 has been removed along a length corresponding to the distance between the planes mentioned wherein the shafts 50a, 51a and 70a, 71a, respectively, are positioned, from the location 59 in FIG. 1 and in direction opposite to the direction of movement of the holders.

The embodiment of the apparatus shown in FIGS. 8 and 9 operates in the following way:

When the knives 70, 71 catch a fish, the end of the abutment pin 64a strikes the abutment plate 63 on the fish holder in question and thereby the head support of this holder will be pivoted to the position shown in dotted lines in FIG. 8 and the knife 70 cuts an occipital cut immediately behind the head of the fish and the knife 71 cuts an abdominal cut, these cuts generally meeting each other in such a way that the head is cut-off in front of the pectoral fins 38 as shown in FIG. 8A. The fish, the head of which has now been removed, is moved further on sitting in its holder towards the set of knives 50, 51 of which the knife 50 increases the depth of the occipital cut and the knife 51 produces a new abdominal cut behind the pectoral fins. The intermediate piece 73a cut-off is suitable for cream of fish in spite of the fact that it contains the collar bones, the pectoral fins and the pelvic fins of the fish.

It will be understood that the embodiment according to FIGS. 8 and 9 besides is constructed and operates in the same way as the embodiment explained in connection with FIGS. 1-7.

According to both embodiments, a curtain 75 is arranged in front of the head cutting-off station which prevents the person who positions the fish in the holders from being sprinkled with water. Only a part of this curtain 75 is shown in FIG. 2 wherein, furthermore, a lattice work 76 is shown which, as it appears from FIG. 1, is arranged after the head cutting-off station at such a distance that the holders 7 with the headless fish arranged thereon, may move downward without collision with the lattice work 76. The lattice work is arranged for the sake of security.

I claim:

1. Apparatus for cutting-off the heads of fish and of the kind comprising a frame (1) with conveyance means (2,3,6) comprising holding means (7) which for each fish comprise a saddle (8) carried by a conveyor (2,3,6), for supporting the body of the fish and a support (10), carried by the same conveyor, for supporting the head of the fish, for transport of the fish bodies and the heads crosswise with respect to the longitudinal direction of the fish at a head cutting-off station comprising two rotating knives (50,51; 70,71), one of which (50;70) serves for providing a cut (53) extending from the back of the fish behind its head and inclined inward and rearward towards the tail of the fish, and the other of which serves for providing a cut (54) extending from the abdominal side of the fish and inclined inward and rearward towards the tail of the fish, said knives being arranged with their circumferences closely ajacent each other, characterized by the head support (10) being pivotably arranged with respect to the corresponding saddle (8) in such a way that the head support (10) is pivotal from a position for supporting the head and to a position which allows the passage of the holding means (7) past the knives (50,51; 70,71) of the head cutting-off station.

2. Apparatus according to claim 1, characterized by the head support consisting of a hub (42) rotatably supported by means of a bolt (21) of the corresponding saddle (8) and of a head supporting plate (43) connected with the hub (42), by means of a rod part (44), the rod part being curved in such a way as to grasp partly around one (51;71) of the knives.

3. Apparatus according to claim 1, characterized by the head support (10) being provided with a guiding stud (56) and by the frame (1) supporting a sliding guide (58) for the guiding stud (56) along a part of the run of the conveyor (6,6) extending towards the head cutting-off station (50,51; 70,71), the sliding guide (58) being adapted for releasing the guiding stud (56) at the head cutting-off station (50,51; 70,71).

4. Apparatus according to claim 3, characterized by the head support, in its head supporting position, comprising an overweight in its direction of pivot.

5. Apparatus according to claim 3, characterized by the hub (42) of the head support being provided with an abutment plate (63) and by an abutment pin (64) provided on the frame (1) for positively causing pivoting of the head support in the released position of the guiding stud (56).

6. Apparatus according to claim 2, characterized by the hub (42) of the head support comprising a stop (61) arranged in a mounting (60), the mounting being adapted for limiting the pivoting of the head support.

7. Apparatus according to claim 1, characterized by the head cutting-off station comprising two sets of circular knives, viz. a first set (70,71) for cutting-off the head and a following set (50, 51) for cutting-off an intermediate part (73a) of the fish.

8. Apparatus according to claim 7, characterized by the shafts (50a, 51a; 70a, 71a) of the two sets of knives (50,51; 70,71) being mutually connected by means of belt drives (72,73).

9. Apparatus according to claim 7, characterized by the first set of knives (70,71) being releasably mounted.

* * * * *